Feb. 20, 1951  R. H. PARK  2,542,564
COLOR PREDICTOR
Filed Oct. 23, 1947  9 Sheets-Sheet 1

INVENTOR
ROBERT H. PARK,
BY
Robert Ames Norris
ATTORNEY

Feb. 20, 1951 — R. H. PARK — 2,542,564
COLOR PREDICTOR
Filed Oct. 23, 1947 — 9 Sheets-Sheet 2
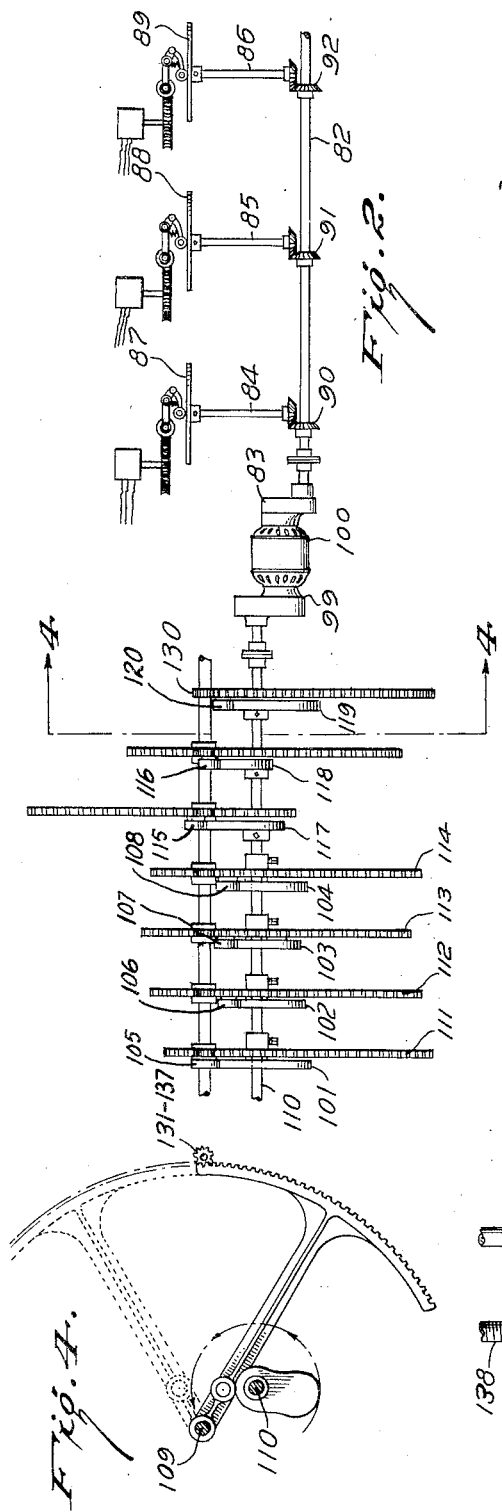
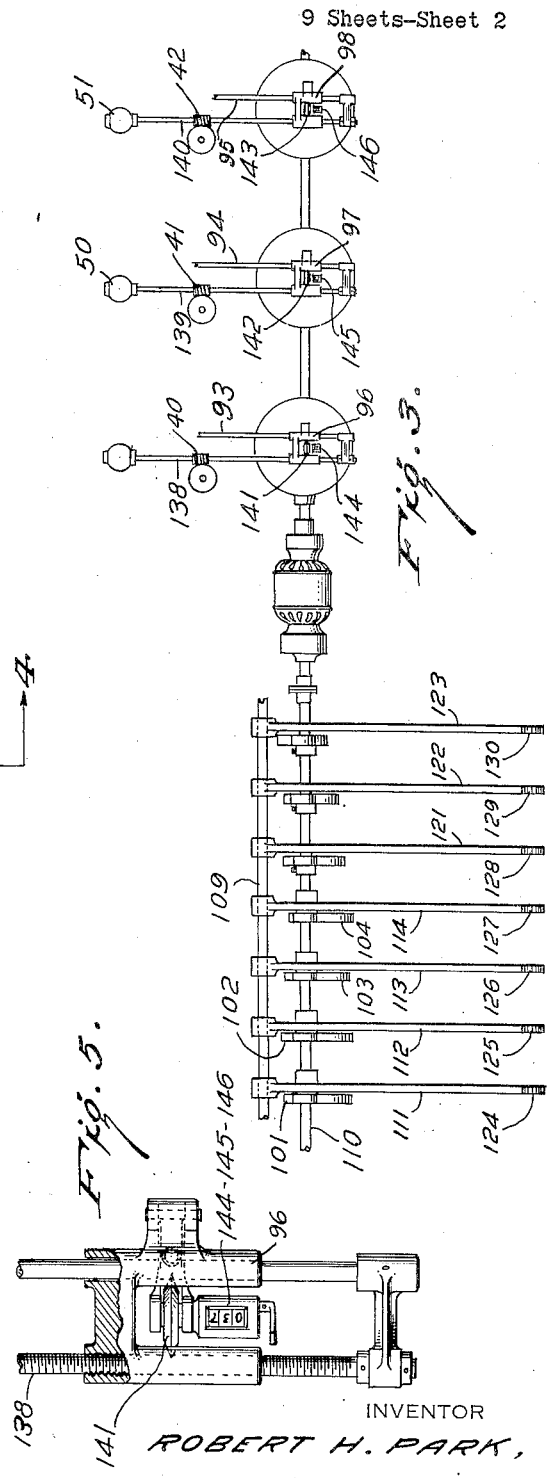
INVENTOR
ROBERT H. PARK,
BY
ATTORNEY Feb. 20, 1951 R. H. PARK 2,542,564
COLOR PREDICTOR
Filed Oct. 23, 1947 9 Sheets-Sheet 3
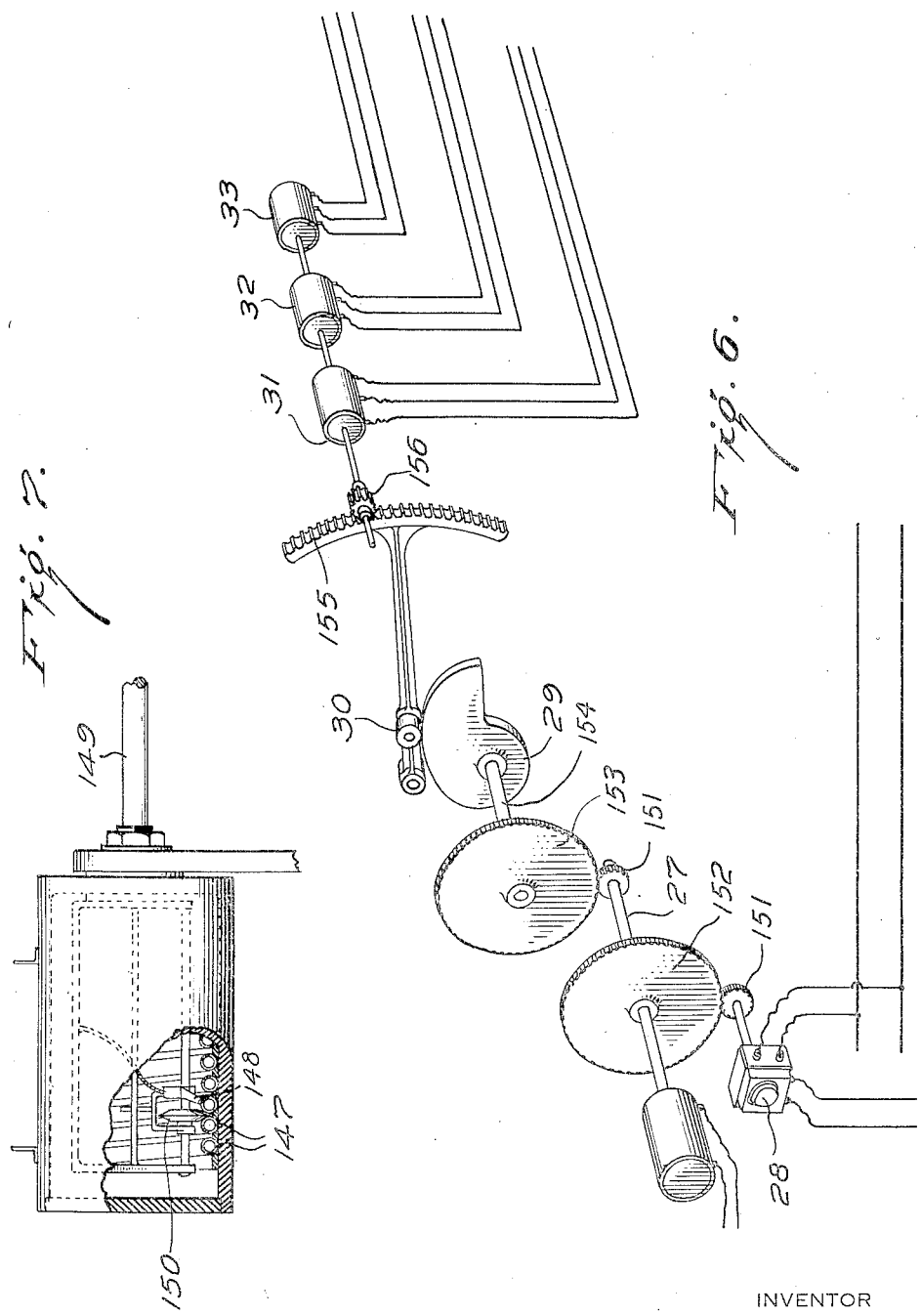
INVENTOR
ROBERT H. PARK,
BY
ATTORNEY

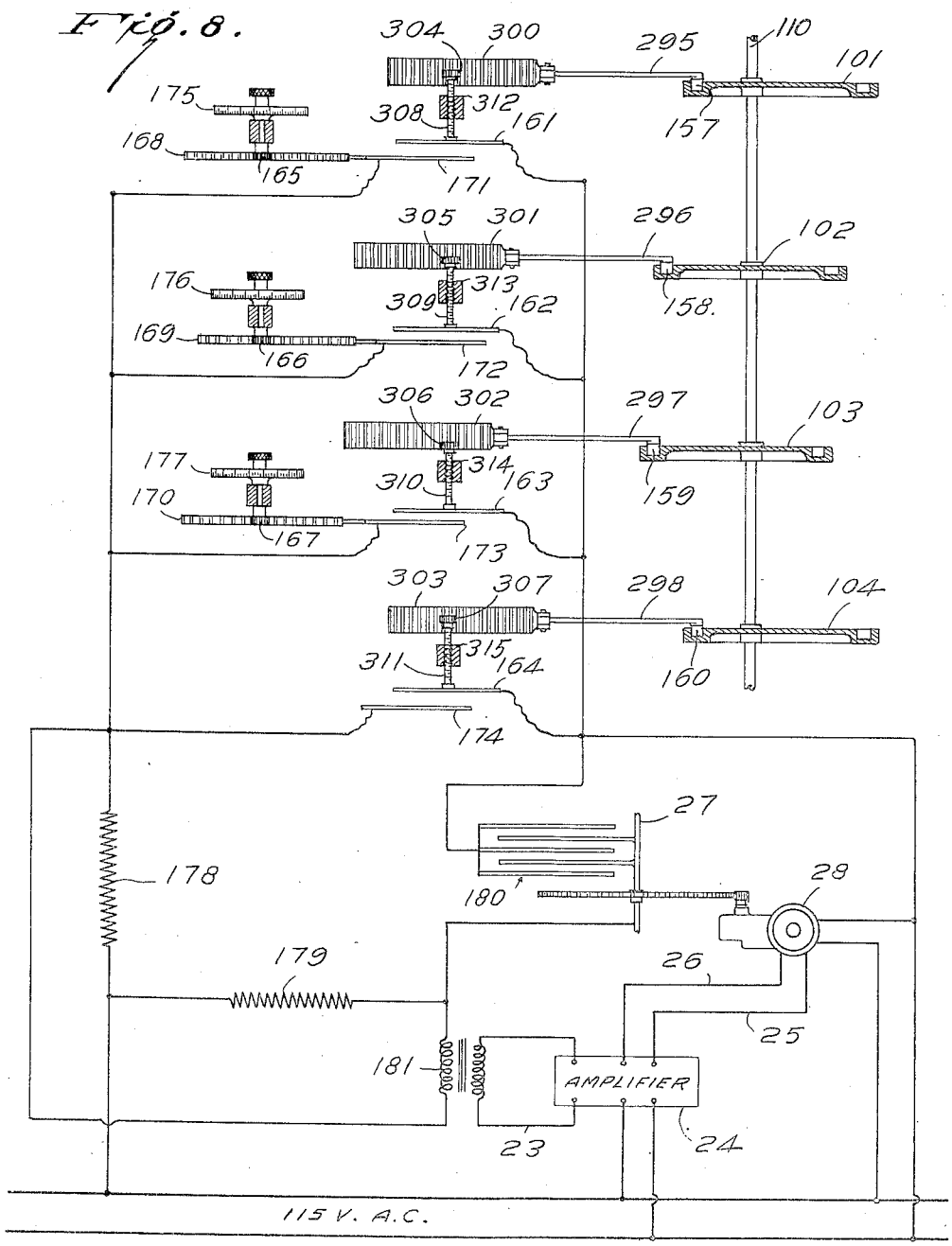

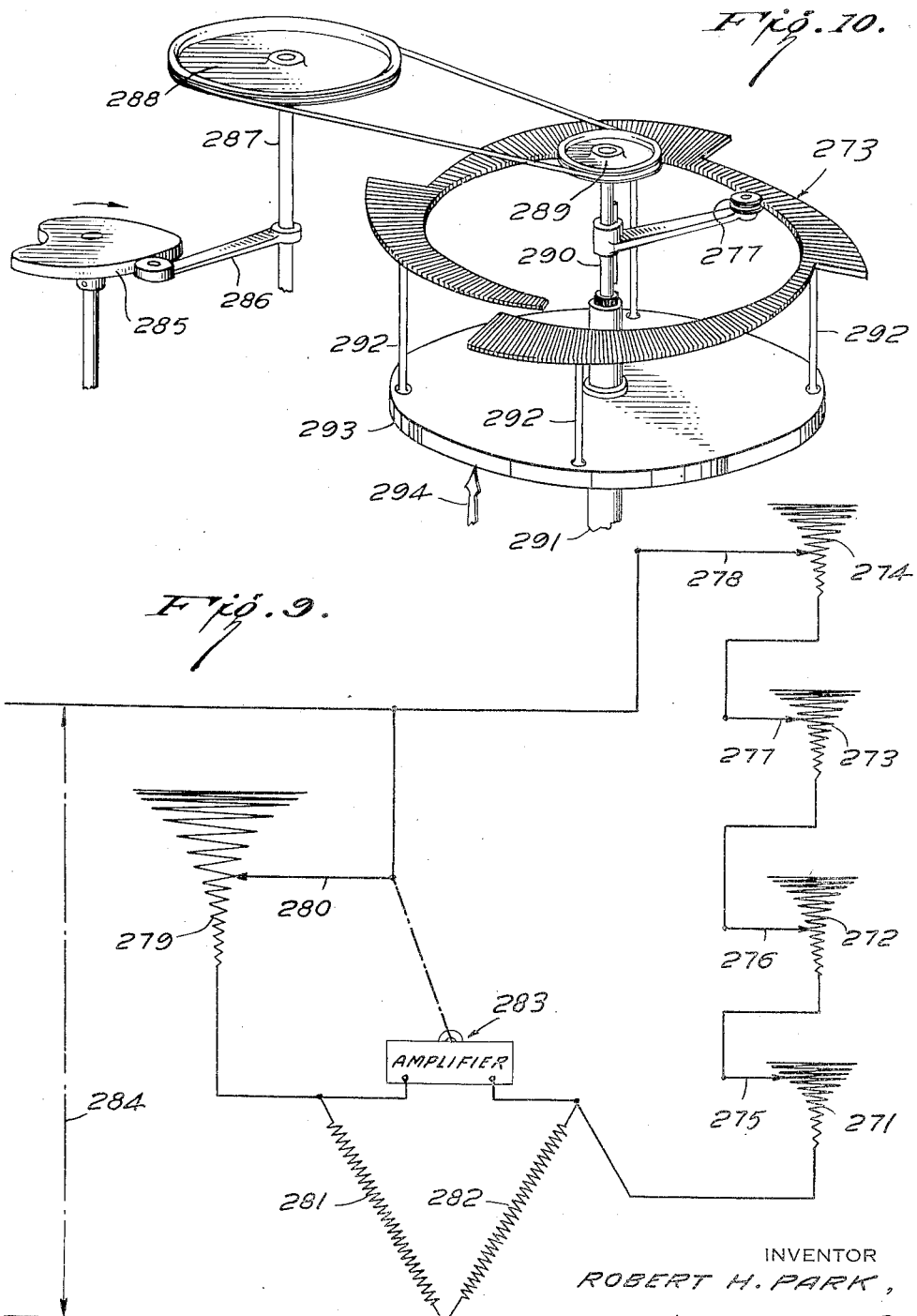

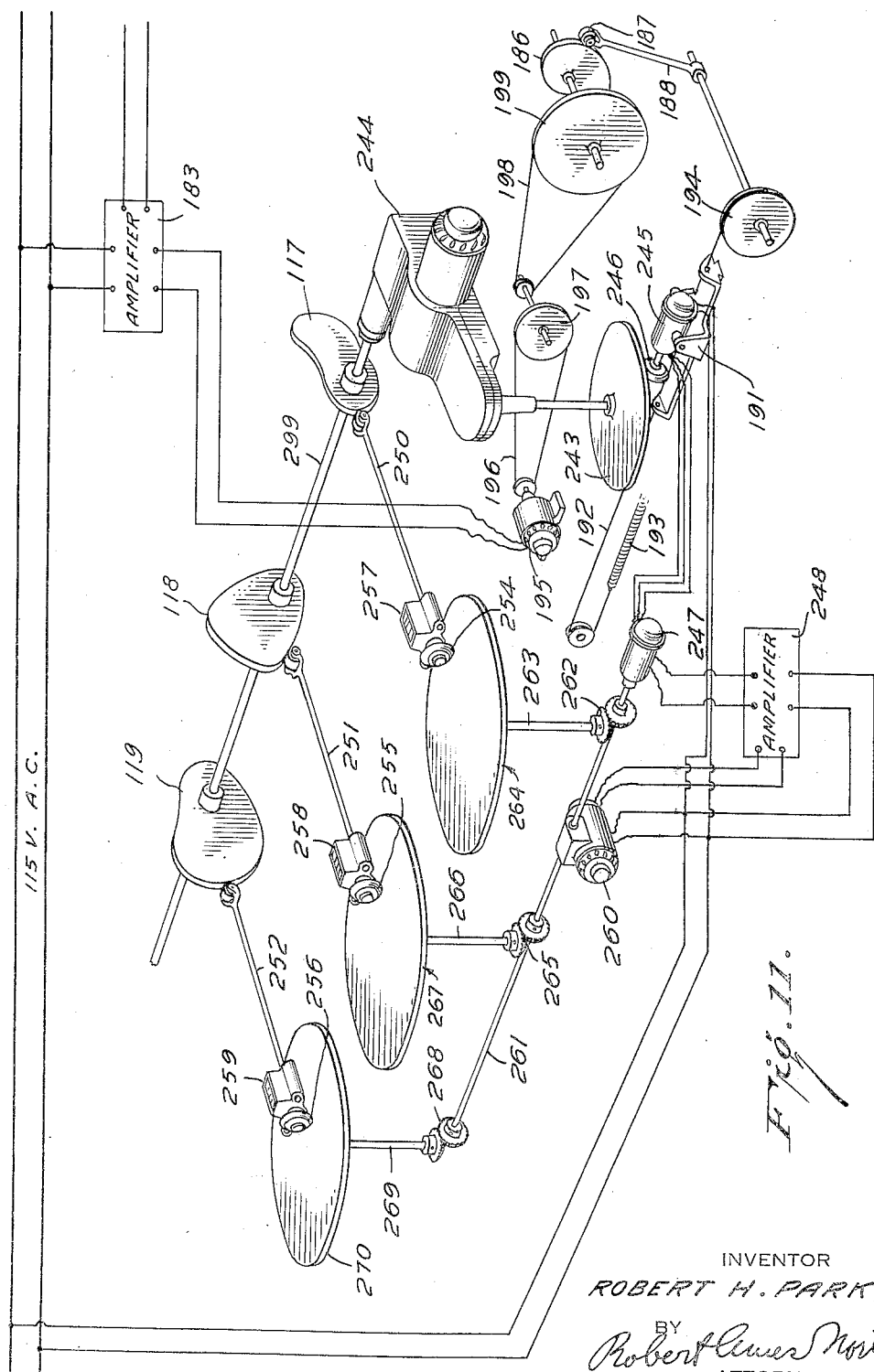

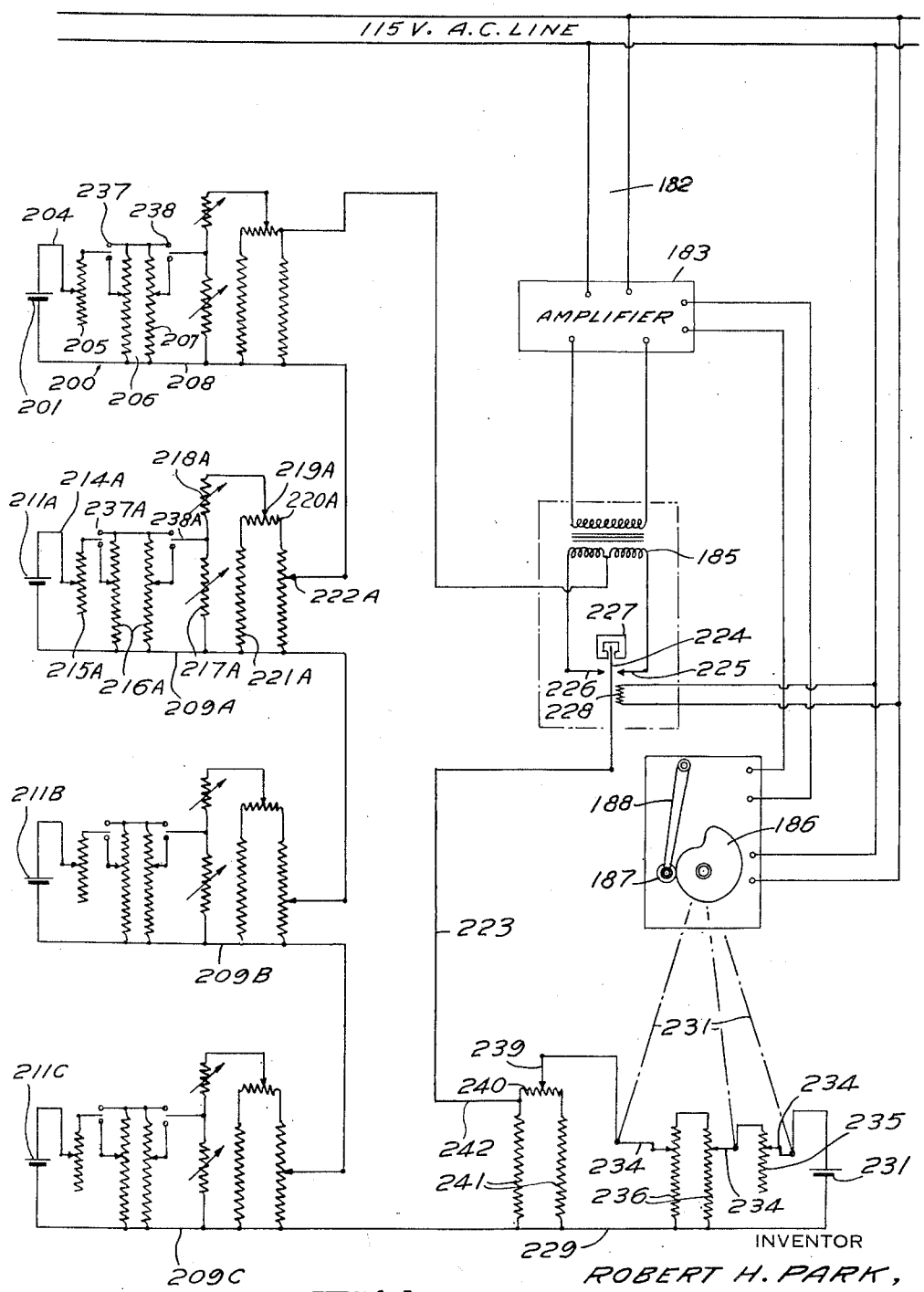

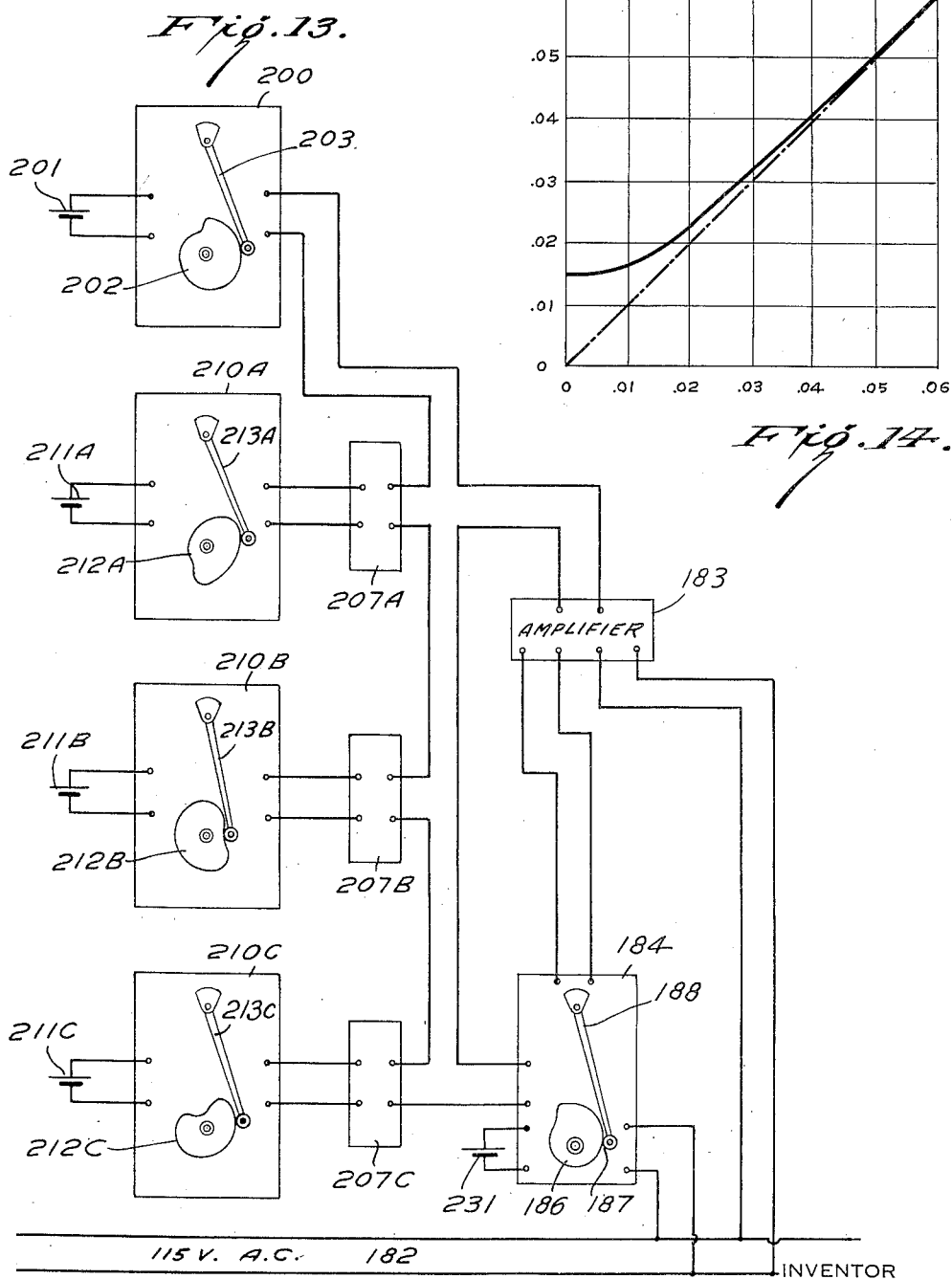

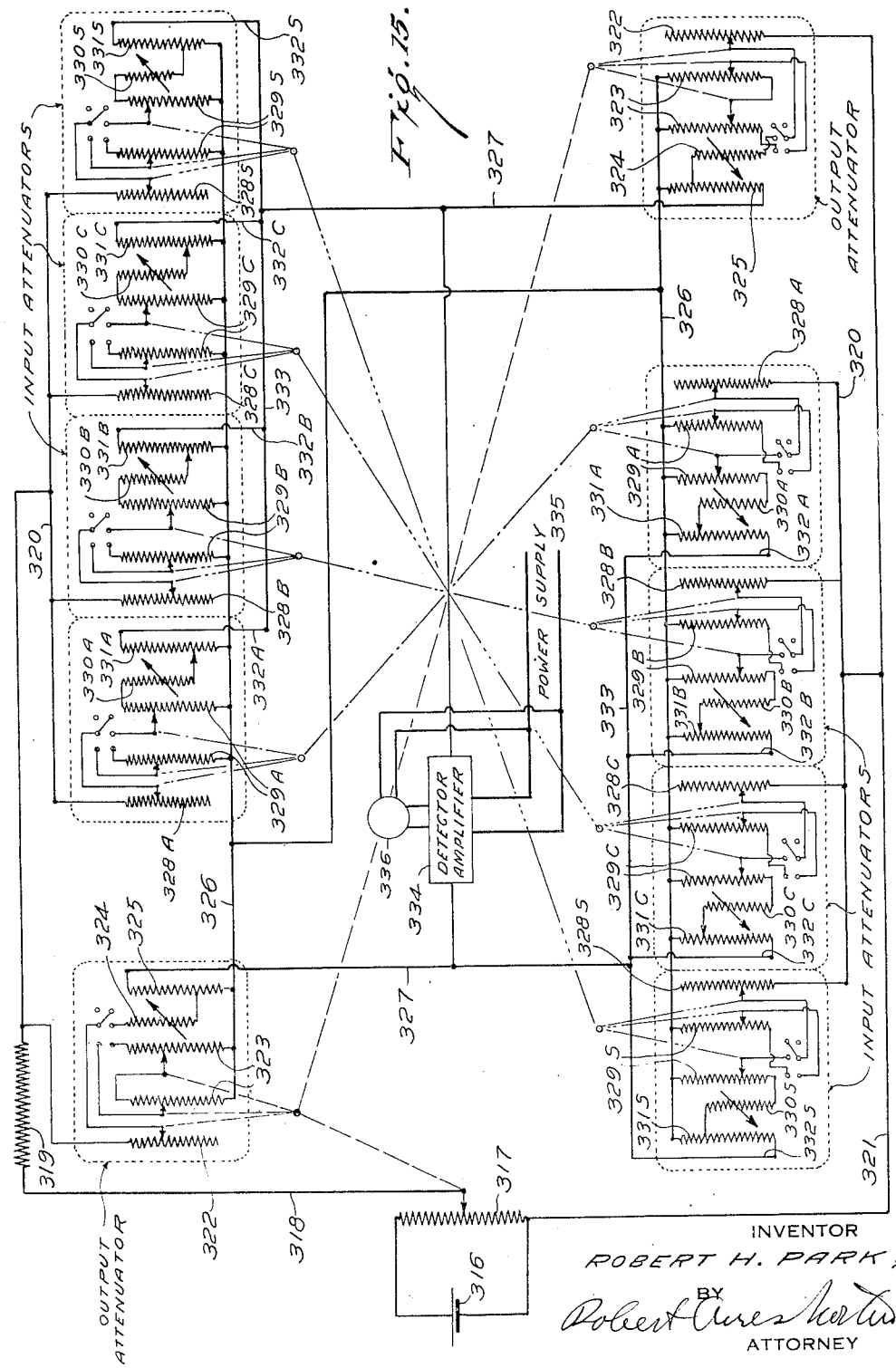

UNITED STATES PATENT OFFICE 2,542,564

COLOR PREDICTOR

Robert Hiram Park, West Hartford, Conn., assignor to American Cyanamid Company, New York, N. Y., a corporation of Maine Application October 23, 1947, Serial No. 781,528

11 Claims. (Cl. 235—61)

This invention relates to a method of determining by continuous integration, the tristimulus values of a mixture of a plurality of dyestuffs and apparatus for carrying out the method.

As there is a certain complexity in terminology used as applied to the tristimulus method of presenting colorimetric data, the following definitions will be given for various terms and these terms will be used throughout the specification and claims in the sense defined, and in this sense only.

It has been established experimentally that light of any color can be matched by mixing together in suitable proportions light of three primary colors. For some colors negative values of at least one of the primaries is required. In the actual physical carrying out of the test it means that the primary is added to the color to be matched against the other two.

The relative amounts of light from a set of three prescribed primary light sources required to match light of any color are called the tristimulus values of that color.

It has also been established that the color of a reflectance sample as viewed under specific illumination by the average human eye can be matched by the additive blend of light from the same three primary sources, the amount of each being determined by the integral with respect to wave length of the product of the reflectance as a function of wave length by the corresponding tristimulus value of monochromatic light at the same wave length, and by the energy density of the light source as a function of wave length, the integration being performed over the full range of the visible spectrum. The product of the tristimulus values of monochromatic light at each wave length and the density of the spectral distribution of the energy of the light source at the same wave length may be referred to as the tristimulus function.

In the method and apparatus of the present invention it is often convenient to introduce data involving as the independent variable, not wave length itself, $\lambda$, but some simple function thereof such as log $\lambda$, in which case it is convenient to arrange mechanism so that the integration may be performed with respect to the simple function of $\lambda$ chosen. In such a case, the tristimulus functions require multiplication by the reciprocal of the derivative of the function of $\lambda$ with respect to $\lambda$. This product behaves in the method and apparatus of the present invention as the tristimulus function. Therefore, in the specification and claims the term "tristimulus function" will be used to include not only the ordinary tristimulus functions themselves, but the somewhat modified functions which result when data are used that are based on the simple functions of $\lambda$. We shall call the result of the integration of the product of reflectance and the tristimulus functions with respect to wave length or functions of wave length over the visible spectrum, "integrated tristimulus values."

Theoretically there are an infinite member of sets of colored lights or primaries which can be used to match any given color to each of which corresponds a set of three tristimulus functions. One or more of them may be physically non-existent but the mathematical functions are just as useful. In ordinary colorimetry, there are a number of factors which restrict the number of sets of tristimulus functions which can be used. Thus, for example, in a large proportion of sets negative values would be required in a part of the spectrum. Therefore, for most colorimetric purposes only tristimulus functions are used which can match any shade without the use of negative amounts. Even with these restrictions there are an enormous number of sets of tristimulus functions which could be used. A second restriction normally applied is that pure white light is represented by equal amounts of the three primaries. In ordinary colorimetry in which the human eye is used as a color detector, it is also desirable that one of the three tristimulus functions correspond to the spectral sensitivity of the eye. This is usually designated as the $y$ function. This function, therefore, represents apparent brightness and when the normal eye is used in colorimetry, it is advantageous to have one tristimulus function read directly in apparent brightness. When all limitations, that is to say, matching without negative quantities of a primary, equal energy spectrum and coincidence of one of the tristimulus functions with eye sensitivity are imposed, there is preferred a special set of tristimulus functions which can be used for any illuminant although, of course, there will be a slightly different set for each different illuminant depending on its spectral characteristics. It is quite common in colorimetry to deal only with the preferred sets of tristimulus functions referred to above.

In the processes and apparatus according to the present invention, the human eye is not used as a color receptor. The coincidence of one tristimulus function with eye sensitivity is, therefore, of minor importance and because it is possible to operate some of the types of processes or of apparatus covered by the present invention so as to indicate negative values of a function, this limitation, which is ordinarily of some importance in colorimetry, is also unimportant. Therefore, for the purpose of the present invention, tristimulus functions and tristimulus values will be used in their more general sense and not necessarily limited to the unique sets of functions for each illuminant which is in common usage in colorimetry. In fact, for certain purposes, the more customary unique sets of functions are less desirable because it is possible by using somewhat different sets of functions to more readily infer what changes in dye or pigment mixture will be required to effect a color match against a standard. In general, it is advantageous for some modifications of the present invention to use tristimulus functions which do not require negative values in matching shades, but in the broader aspects of the invention any sets of tristimulus functions may be used and are included.

For any non-fluorescent so-called "substrate" such as wool cloth made from a particular type of wool and with a particular weave, or other fabric of whatever type, or sheet of paper, pigmented film, plastic or other material, containing various non-fluorescent colorants, distributed homogeneously or in any non-variable way, it normally will be true that for those colorants, say, A, B, C whose percentage influence on the diffusing properties of the substrate as colored is small, which is the case with nearly all dyeings, there will exist a function K having the property that if Rs is the reflectance of the substrate prior to the addition of colorants A, B, C . . . $R_{as}$, $R_{bs}$, $R_{cs}$ . . . are respectively the reflectances of the substrate after addition of standard or reference quantities of each of the colorants A, B, C . . ., and $C_A$, $C_B$, $C_C$ . . . are the concentrations of these colorants in the mixture in relative measure to the various standard concentrations, then it will be true that $$K_m = C_A K_A + C_B K_B + C_C K_C + \ldots K_s$$

where $K_A = K_{AS} - K_S$
$K_B = K_{BS} - K_S$
$K_C = K_{CS} - K_S$ . . . etc.

and, in general, $K_x$ is the value of K appropriate to the argument $R_x$, i. e. $K_x = K(R_x)$. The quantity K is designated as the additive function.

The total reflectance of a diffusing medium will be considered as comprising a small term $s$ corresponding to surface reflectance and a term $b$ corresponding to body reflectance, such that $$R = b + s$$

and $$K = \frac{(1-b)^2}{b}$$

and tests on a variety of materials tend to show that if these relations are introduced the magnitude of the quantity $s$, which is found to be determined by them, tends except at very low values of R to be of the general order of magnitude of the reflectance that would be expected from the geometry and known values of the refractive indices of the components of the substrate.

Moreover, since $b$ is of the general order of magnitude of the reflectance R, is often convenient to employ it rather than the quantity R, although to avoid ambiguity $b$ must be regarded merely as a quantity derived from R which happens to have been given the designation "body reflectance," and which therefore, is more properly designated as the "apparent body reflectance," while similarly $s$ is a similarly determined quantity which is generally referred to as "surface reflectance" but which properly should be designated as "apparent surface reflectance."

It is also convenient to define quantities pertaining to dyestuffs in application to specific substrates which are designated as specific apparent reflectance values and which have the property for dyestuff $x$ of standing in the same relation to $K_x$ as $b$ does to K. Thus using for the specific apparent reflectance of dyestuff $x$ the symbol $b_x$ is given by the relation $$K_x = \frac{(1-b_x)^2}{b_x}$$

It should be noted that $b$ is not the same as the overall reflectance R which can be measured by a spectrophotometer. The latter includes not only the reflectance of the color particles themselves, but also $s$ which will vary with different surfaces and in the case of textiles, with different fibres and weaves. The effect of $s$ is greatest in very dark shades because $s$ constitutes a larger percentage of the total reflection when the $b$ has a small value. Graphs showing the difference between $b$ and R for various depths of shade in a typical wool material will be illustrated in connection with the description of the drawings.

It will be apparent from the above that the surface reflectance term is not additive, or at least in many cases, it includes components which do not constitute simple linear functions of an additive quantity. This fact restricts somewhat the applicability of the present invention to all fabrics and surfaces and in the discussion of some of the more complex and preferred modifications of the invention the correction factors necessary in some cases will be discussed more fully as their application will then be more apparent.

One of the most serious problems in the dyestuff industry is matching desired shades with mixtures of dyestuffs. In the past this has been solved by purely empirical cut and try methods or by methods involving mathematical calculations. Any exact method of matching involves obtaining the exact integrated tristimulus values of successive mixtures of dyestuffs. It is known how to obtain the integrated tristimulus values of the shades to be matched. This can be effected by using a standard type of flickering beam spectrophotometer to which has been attached mechanisms for integration to tristimulus coefficients as the spectrophotometer operates. Such a device is described in the patent to Hardy, No. 1,799,134.

In the past when the tristimulus values of the shade to be matched had been obtained, the spectrophotometric curves of the dyestuffs to be used were obtained for standard concentrations. From this data it is possible, by a series of mathematical operations, to determine successive approximations to composition of the mixture required to effect a match. The operations are time consuming and unless, by reason of exceptional judgment or more often good luck, the initial approximation is close to a match, it is necessary to perform successive computations approaching the final results more and more closely. Each computation is time consuming, and the final determination of a match may take a matter of hours or even in exceptionally difficult cases, days.

The disadvantages of the methods previously used are twofold; First, the time required for obtaining integrated tristimulus values for each trial computation is excessive, and secondly, if mathematical prediction is not used, extensive experimental dyeings are necessary and the time consumed depends on the skill or luck of the colorist.

The present invention concerns the method and apparatus for rapid prediction of the integrated tristimulus values of any mixture of any number of known dyes in any chosen concentrations. The time can be reduced to about two minutes or less. Its accuracy is high and is unaffected by the skill of the colorist. It is necessary with the process of the present invention, just as it was before, to obtain a final match by a series of approximations. However, the determination or prediction of integrated tristimulus values of mixtures can be reduced from a matter of hours down to two minutes. It is, therefore, possible to examine successive formulations with slightly changed dye concentrations one after another, and the final match can be obtained in a matter of a quarter of an hour to an hour instead of several hours or days. In favorable cases with a highly skilled colorist, it is possible to obtain a match in even shorter time. The process of integrated tristimulus value prediction for a mixture requires certain essential steps. First, it is necessary to transform the spectrophotometric data for each of the colors to be used, and for the substrate or fabric where it is not a pure flat white, into physical quantities which are proportional to the additive function of reflectance.

There are various ways of producing the physical quantities which are proportional to $K$ for each component. For color A this quantity is $C_A K_A$ i. e., $K_A$ times the concentration of the coloring material A. It is possible, in a machine which operates within certain ranges, to use rotary cams, the profiles of which correspond to $1/K$ for the various components. It is also possible to use the corresponding curves themselves with photocell followers. Each physical quantity is then multiplied by the chosen concentration of the dyestuff to produce a physical quantity, preferably an electrical voltage, proportional to $CK$ at each wave length in the spectrum. The cams corresponding to the colors may be rotated by a common shaft or synchronously through the spectrum. It might be thought that the simplest way of producing $K$'s would be using cams, the profiles of which correspond to the $K$'s for each color and substrate. However, the practical range of $K$'s is too great for satisfactory cam design. Therefore, circuits are employed which allow use of cams having profiles proportional to $1/K$. These cams for large values of $K$ correspond approximately to $b$.

This method of producing additive physical quantities employs a simple circuit and is satisfactory where the range of $1/K$ is not too great and does not include values of $K$ at certain points of the spectrum which are small, as in the case of certain very light shades of dyes. An inspection of the basic equation for the additive function $K$ given above shows that for large values of $1/K$, the rate of change of $b$ is too little for good cam design. In these extremes, it is not possible to obtain high accuracy by the use of a simple circuit. Feasible mechanical tolerances may introduce large errors at these extreme ranges. Where, therefore, it is desired to carry out the process of the present invention or to produce a machine capable of carrying it out in ranges where a simple circuit is not sufficiently accurate, it is possible by more complicated electrical networks to produce $CK$ quantities with high accuracy. Such modifications of the process and apparatus are included in the present invention wherever the high accuracy in extreme ranges warrant the somewhat greater complexity. The more refined modifications for higher accuracy will usually involve the use of different circuits for different ranges of $1/K$ and $R$. However, changing from one circuit can be accomplished merely by reconnection, and this additional complication is not serious as will be described in more detail in conjunction with the description of preferred modifications.

The physical quantities such as electrical voltages corresponding to $CK$ for each dyestuff and for the substrate or fabric are then added, in the case of voltages, of course, by connecting them in series. A physical quantity such as a voltage is thus obtained which represents the sum of $CK$'s for the dyes and substrate at each wave length in the spectrum. This may be considered as the $K_m$ for the mixture and it is then transformed into a physical quantity proportional to the reflectance $R$. This transformation presents the problems of excessive rate of change of $R$ with $K$ for small values of $K$, for mechanical transformation elements such as cams. In the case of both simple and complex circuits referred above, the same or a similar electrical circuit is operated in reverse. In both the simple and complex circuits, the transformation of $K_m$ to $R_m$ is best effected by a motor driven matching device which will match the voltage corresponding to $K_m$ of the mixture or similar additive quantity with another such quantity. The movement of the motor driven matching element is used to drive cams or other devices to effectuate the transformation. In the case of a machine which does not involve the use of a complex circuit, it is possible to match voltages by the use of a battery and a single motor driven rheostat. When suitable values are chosen, this results in a movement of the matching device which corresponds to $1/K$. A cam capable of transforming the function approximating $1/K$ to $R$ is not beyond the practical operating characteristics of a cam.

When capacities are used instead of voltages, matching condensers with non-uniform plate radius may be employed so that the rate of change of $K$ into $R$ is not excessively abrupt.

The result of the foregoing step is to produce a quantity or a series of equal quantities proportional to the reflectance of the mixture of dyes, or dyes and substrate. The quantity corresponding to $R$ can be combined with the tristimulus coefficient for each of the three stimuli and these three products continuously integrated through the desired portion of the spectrum. This method of continuous integration to produce three integrated tristimulus values is not itself a new procedure. It has been effected by a device connected to the portion of a spectrophotometer which generates the quantity proportional to $R$ in the Hardy patent, 1,799,134 referred to above, using purely mechanical integrators. The details of this integrating step are not broadly involved in the process of the present invention. It is an advantage that this step can be carried out if desired by known mechanical devices. It is possible to effect the integration by producing electrically quantities corresponding to $RX(\lambda)$, $RY(\lambda)$, $RZ(\lambda)$, and matching these quantities by power driven matching generators, the drive of which can be used to operate one element of a planimeter type of mechanical integrator. Such electromechanical methods and processes are included in more specific aspects of the present invention.

I prefer to use a method of integration which is mechanical but which differs from that of the Hardy patent and possesses advantages in simplicity and ruggedness. In this method I break up the integration into two mechanical steps. First, a mechanical integrator capable of considerable power output of the variable ratio type which integrates reflectance with wave length. The output of this first mechanical integrator is used to drive the discs of a plurality of planimeter type integrators, the planimeter wheel carriages of which are shifted on the disc in accordance with the three tristimulus functions which can be effected very simply by the use of cams having the profiles of the three tristimulus functions.

If integrated tristimulus values corresponding to a plurality of illuminants is desired, for example, daylight and incandescent light, the preferred procedure and apparatus is particularly suitable. The output of the first integrator can drive the discs of any number of planimeter integrators in sets of three for each illuminant, the carriages being driven by cams having the tristimulus functions of the illuminants. These cams can be driven from a single source. For this reason, and also because of the reduction in number of parts and increased ruggedness, the preferred method of integration and device for carrying it out constitutes a preferred modification of my invention.

When the dyestuffs and substrate have been investigated, wave length by wave length throughout the spectrum, the integrators will give values, preferably readable on dials or counters, of the tristimulus functions integrated throughout the spectrum, in other words, integrated tristimulus values. These are then compared with the tristimulus values of the color to be matched and if the values do not agree, suitable adjustment is made of concentration attenuators or manipulation of the process steps which modify the transformation of the quantities proportional to the additive function in accordance with concentration, until a slightly different mixture is obtained which is again investigated, and the integrated tristimulus values compared with those of the desired shade.

It will be apparent that the present process is still one of successive approximations. However, when performed on an automatic machine, integrated tristimulus values are obtained in so short a time and the process of approximation becomes speeded up by such a large factor, that the time consumed in making a match is reduced to a different order of magnitude from that which is customary at the present time when such matches are obtained by test dyeings or by a solution of mathematical equations giving predicted tristimulus values.

The process and apparatus of the present invention integrate without break throughout the whole spectophotometric curve for each of the dyes chosen and the substrate. The integrated tristimulus values are therefore completely accurate and the present invention should not be confused with approximate methods and apparatus using a few ordinates, either selected or weighted. Such processes and apparatus have been proposed and give approximate integrated tristimulus values of a mixture of colors substantially instantaneously. They have the advantage of reducing the time for obtaining integrated tristimulus values from minutes or a fairly large fraction of a minute down to a matter of a second or two, but they have the disadvantage that the results are approximations only because there is no continuous integration over the whole spectrum. The two methods and devices are useful for different purposes. Where only approximate integrated tristimulus values are needed, and the approximation of the ordinate method is sufficiently close, this method involves a great advantage in time over the process and apparatus of the present invention. However, it is incapable of continuous integration, and hence of obtaining integrated tristimulus values of color mixtures which are completely accurate. Where this accuracy is needed, the process and apparatus of the present invention may be used, and although the time required is somewhat greater it is a practical way to obtain the required accuracy. The increase in time, while considerable as compared with the chosen ordinate method, is still only a small fraction of the time required to obtain integrated tristimulus values by computation.

The process of the present invention in its preferred form in which there are used cams for the colors of the mixture, may be modified in various ways. These cams may be constructed of fairly heavy gage material with adequate mechanical strength so that they can drive potentiometers or other mechanisms directly. This has the advantage that the steps and apparatus in the transformations can be simplified. It has the disadvantage that the cams are relatively more costly and as a separate cam is required for each dyestuff this may involve a large inventory of heavy and expensive cams. It is quite possible to use cams of relatively light material which operate through relays of conventional design or with special low friction rheostats and potentiometers. This involves some added complexity in apparatus and slows operation, but cheap light cams can be used. The present description will deal mainly with methods and apparatus in which a direct drive is used. For many operations this is not preferred, as the relays are obtainable at reasonable cost and the advantages of the lighter cam material are very real. The advantages are particularly important in matching an unknown shade, in that a cam has to be cut for this shade corresponding to the spectrophotometer curve of the additive function or R in the case of the more complicated circuit. These shade cams have to be cut quickly as it is not possible to keep inventories of them as is the case with cams corresponding to known dyestuffs. A modification in which the operation is effected optically where a photocell follower is used with a curve of the additive function or R on paper or other material, may be considered as a form of optical relay.

The present invention is not limited to the use of any particular additive physical quantities. For practical purposes, however, the use of electrical voltages presents so many advantages that they are preferred. Simple apparatus for performing the process is possible, and component parts including relays, matching devices, and the like, are available in standard designs which greatly reduce the cost of operating the process and building the apparatus. Therefore, I prefer to employ the modifications utilizing electrical voltages as the additive physical quantities.

The invention will be described in more detail in conjunction with the drawings, in which:

Fig. 2 is an elevation of the main mechanical elements of the invention;

Fig. 3 is a plan view of the elements shown in Fig. 2;

Fig. 4 is a section along the line 4—4 of Fig. 2;

Fig. 5 is an enlarged detailed view of an integrating device;

Fig. 6 is a perspective of the mechanical parts of the voltage matching device shown in Fig. 1;

Fig. 7 is a detailed view of a commercial helical potentiometer, usable as a potentiometer or rheostat;

Fig. 8 is a wiring diagram of a modification of the invention using capacities instead of voltages;

Fig. 9 is a diagram of a modification of the invention using resistances instead of capacities;

Fig. 10 is a detail of the drive of one resistance of Fig. 9;

Fig. 11 is a diagram of a preferred modification incorporating highest accuracy;

Fig. 12 is a wiring diagram of Fig. 11;

Fig. 13 is a block diagram of the mechanical and electrical elements of the matching drive of Fig. 11;

Fig. 14 represents a curve showing the relation of $b$ and $R$;

Fig. 15 is a wiring diagram similar to Fig. 12 but illustrating a modification using current addition instead of voltage addition;

Fig. 1 illustrates the wiring diagram of a preferred modification of the present invention in which voltages are used as additive quantities. To facilitate the description Fig. 1 should be considered in connection with Figs. 2, 3, 4, 6, 7 and 8.

Figure 1:
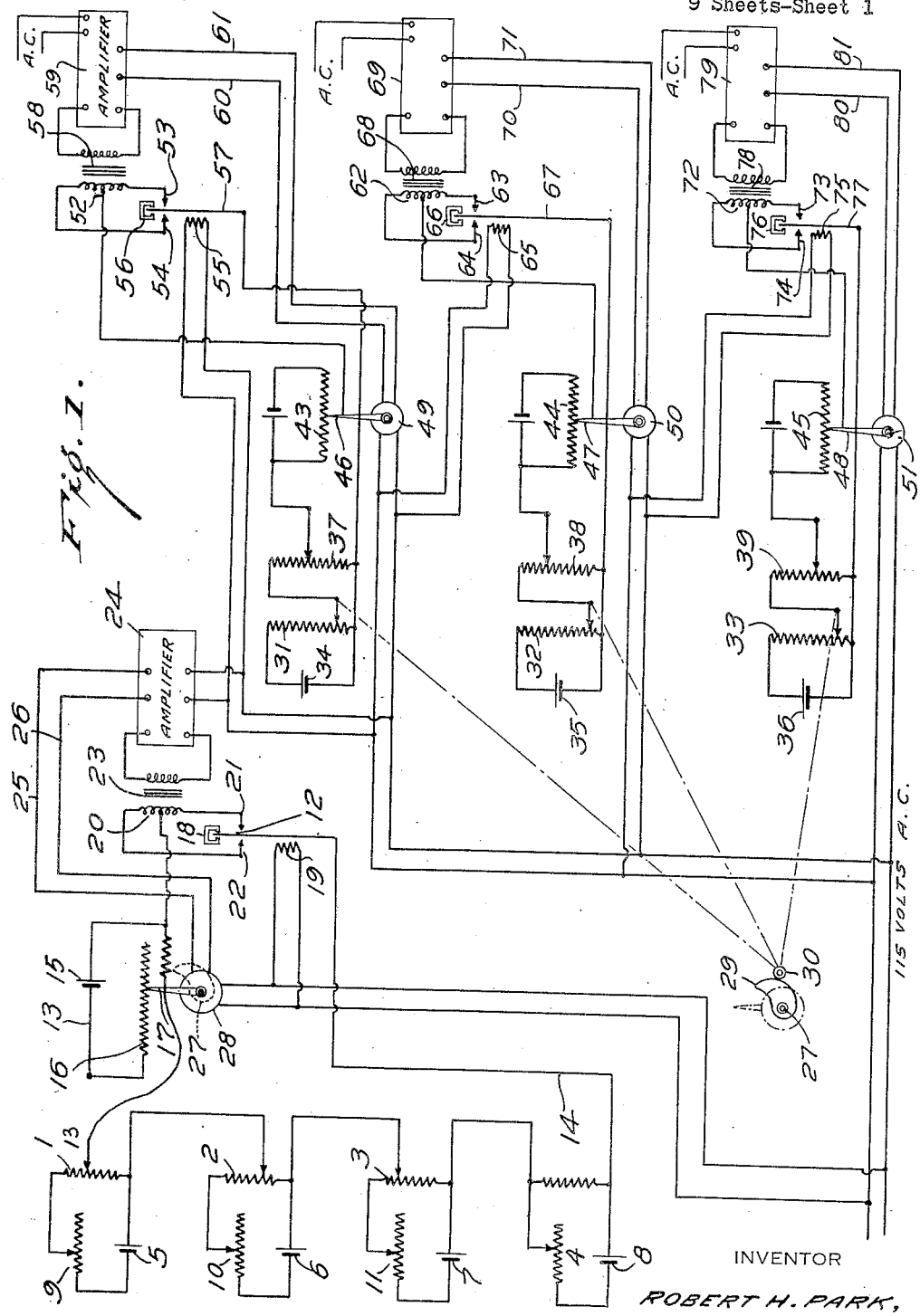
Fig. 1 is a wiring diagram of one modification of the invention.

The diagram shown in Fig. 1 is for a color predictor which is to give integrated tristimulus values for the shade corresponding to a mixture of three chosen dyestuffs and a particular substrate. This requires the potentiometers 1, 2 and 3, corresponding to concentration of the three dyes and a fixed resistor for the substrate. Across the resistance of the potentiometers there is impressed voltages from batteries 5, 6, 7 and 8, respectively. For the three dye potentiometers these voltages are adjusted respectively by three variable resistances or rheostats 9, 10 and 11, the adjustment producing voltage across the resistances of the potentiometers, which voltage is proportional to the K of the respective dyes. The voltage for the substrate is controlled by rheostat 4. These rheostats may preferably have values from 10,000 to 50,000 ohms, depending on the choice of battery and other factors. The potentiometers 1, 2 and 3 have resistances of the order of 10 to 50 ohms. The variable resistances may be of known design. The invention is mainly concerned with the effect of their electrical characteristics rather than their physical structure.

The rheostat 4 for the substrate is not provided with any potentiometer as no concentration is involved, and a battery protecting resistor is all that is needed. Each of the rheostats 9 to 11 and 4 is driven proportionately to the profile of a corresponding cam 101, 102, 103 and 104 (Figs. 2 to 4). The profiles of the cams are such that the output voltage is proportional to the K of each dye throughout the visible spectrum.

In order to obtain great accuracy in the setting of the rheostats a commercially available design of helical potentiometer or rheostat may be used, which is shown in detail in Fig. 7. These helical potentiometers consist of a coil of resistance material 147, which is shown diagrammatically as a single wire, but which may, if desired, be a coil of fine resistance wire, over which a contact 148 is moved by rotation of a shaft 149 carrying keyed thereto and axially movable a carriage with a guide wheel 150.

The four rheostat cams are mounted on a shaft 110 which is slowly rotated by the main driving motor 100 through gear box 99. The cams move cam followers 105, 106, 107 and 108 on arms 111, 112, 113 and 114, which arms are journaled on a common shaft 109 (see Fig. 3). The arms carry at their extremities segmental racks 124, 125, 126 and 127. These in turn mesh with pinions 137, 136, 135 and 134, which drive the rheostat shafts, as described above. The rack and pinion teeth numbers are so chosen with respect to the maximum cam profile that they are capable of driving each rheostat throughout its full range.

The three potentiometers 1 to 3 and the fixed resistance in series with rheostat 4 are connected in series and the sum of their voltages is therefore impressed across the wires 13 and 14. The former connects to a motor driven contact 17 on rheostat 16 associated with a battery 15 and fixed series resistance. The other wire 14 leads to a vibrator contact 12 which is energized by a coil 19 connected to the common alternating current line shown at the bottom of Fig. 1. The permanent magnet 18 at the end of the vibrator contact causes the latter to vibrate at the frequency of the energizing coil 19 which will ordinarily be the 60-cycle frequency of conventional power supplies, and the wire 14 is therefore alternately connected to contacts 21 and 22 which connect to the ends of a center tapped primary coil 20 of a transformer 23 which serves as an input transformer of the low frequency vacuum tube amplifier 24. The center tap of the coil 20 leads to the fixed resistor in series with rheostat 16. As a result, the sum of the voltages from potentiometers 1 to 3 and the resistor in series with rheostat 4 is connected in opposition to the voltage across the resistor in series with resistance 16 of the motor driven rheostat and the differential voltage is reversed at the frequency of the alternating current supply voltage for which the amplifier 24 is designed. This differential signal, amplified by the amplifier 24, passes through the wires 25 and 26 to the motor 28, which is energized by the main alternating current power supply. The motor drives a shaft 27 through a pinion 151 and gear 152 (see Fig. 6).

The phasing of the motor is such that the movable rheostat arm 17 which is turned by the shaft 27 moves in a direction to bring the voltage to equality with the sum of the voltages of the potentiometers 1 to 3 and the resistor in series with rheostat 4. As the voltages approach each other the magnitude of the input signal to the amplifier 24 decreases, which in turn decreases the output and the motor 28 slows up until finally it stops when balance is reached. The motor driven matching rheostat forms no part of the present invention, as it is a commercially available device. Its principal parts therefore are the only ones shown in Fig. 6. A conventional helical rheostat is illustrated which is of the same type as that shown in Fig. 7.

The shaft 27, the angular position of which corresponds to the magnitude of the sum of the voltages of the potentiometers 1 to 3 and the resistors in series with rheostat 4 drives thru a pair of gears 153 a shaft 154 carrying a cam 29 on which a follower 30 moving a pivotally mounted arm provided at its end with a rack 155 similar in construction to the racks 124 to 127 which have been described above. This rack drives a pinion 156 which is connected to the common shaft of three equal potentiometers 31, 32 and 33 (see Fig. 6). These potentiometers may be of the helical design shown in Fig. 7 and are across batteries 34, 35 and 36 and feed three equal potentiometers 37, 38 and 39. The potentiometers 31 to 33 are preferably of much lower resistance than potentiometers 37 to 39 in order to avoid affecting the accuracy of reading of the latter.

The voltages applied to the resistances of the potentiometers 37 to 39 are determined by the profile of the cam 29. The cam 29 is provided with a profile which transforms $1/K$ into reflectance. In other words, the profile is such that there is applied at any setting of the cam equal voltages on the three potentiometers 37 to 39 corresponding to the reflectance value of the three dyes and the substrate for the particular wave length of the spectrum corresponding to the position of cams 101 to 104.

Potentiometers 37 to 39 are driven respectively by three additional cams 117, 118 and 119 through cam followers 120, 116, and 115, arms 123, 122 and 121, racks 130, 129 and 128, and pinions 131, 132 and 133. The drive is shown in Figs. 2 and 3, and the details of the rack and pinion construction for cam 117 is shown in Fig. 4. These cams are fixed on the same shaft 110 as are cams 101 to 104. The profiles of the cams correspond to the three tristimulus coefficients at each wave length in the spectrum. The slow rotation of the shaft 110 by the motor 100 successively sets rheostats 1 to 4 for the K of the three dyes and the substrate, and at the same time sets potentiometers 37, 38 and 39 in proportion to the three tristimulus coefficients at the same wave length. Since, however, the voltage applied to the potentiometers 37 to 39 is proportional to the reflectance at the same wave length of the three dyes and the substrate, the output voltages of the potentiometers will be proportional to this reflectance multiplied by each of the tristimulus coefficients.

The three tristimulus values obtained from the potentiometers 37 to 39 are each matched by a self-driven potentiometer operating in exactly the same manner as the self-driven rheostat 16 which matched the sum of the voltages of potentiometers 1 to 3 and the resistor in series with rheostat 4. These three self-driven potentiometers 43, 44 and 45 are provided with batteries and movable contacts 46, 47 and 48 driven by motors 49, 50 and 51. The motor driven potentiometer voltages are connected in opposition to the voltages from the potentiometers 37 to 39 as described in connection with the matching potentiometer for potentiometers 1 to 3 and the resistor in series with rheostat 4. This involves connecting one end of the resistance of the potentiometers 37 to 39 to vibrator arms 57, 67 and 77, which are energized by coils 55, 65, and 75, connected to the main A. C. line and permanent magnets 56, 66 and 76. The vibrators contact respectively contacts 53—54, 63—64 and 73—74, which are connected to the ends of the center tapped coils 52, 62 and 72 of the input transformers 58, 68 and 78 of amplifiers 59, 69 and 79. The output of these amplifiers pass through wires 60—61, 70—71, 80—81 to the motors 49, 50 and 51.

The main drive motor 100 drives a shaft 82 through reduction gearing 83 which may advantageously provide much less reduction than the gearing 99. Thus, for example, the shaft 82 may turn one hundred revolutions instead of one in two minutes. The shaft is provided with pairs of bevel gears 90, 91 and 92 which drive vertical shafts 84, 85 and 86, on which are mounted rotating discs 87, 88 and 89 (see Figs. 2 and 3). These discs may be of considerable diameter, for example, of the order of magnitude of 6 to 8 inches. Extending over the discs are fixed rods 93, 94 and 95, on which move carriages 96, 97 and 98. One of these carriages is shown in enlarged detail in Fig. 5. One side of the carriage has a threaded portion which fits on threaded shafts 138, 139 and 140 driven by the motors 49, 50 and 51. These shafts rotate at the speed of the drive pinion of these motors and drive the potentiometer contacts 46, 47 and 48 thru worms and gears 40, 41 and 42. The pitch of the threaded shafts 138 to 140 is such that the carriages 96 to 98 will move about half the diameter of the discs 87, 88 and 89 for a movement of the potentiometer contacts 46 to 48 from one extreme to another. The carriages 96 to 98 carry sharp planimeter wheels 141 to 143 driving counters 144 to 146.

It will be apparent that the position of the planimeter wheels 141 to 143 is determined by and is proportional to the tristimulus values. Since the position of the planimeter wheels on the discs determines the speed ratio between disc and wheel at any wave length in the spectrum corresponding to a particular position of the shaft 82, the planimeter wheels will be turning at a rate of speed proportional to the tristimulus values of the reflectance of the sum of the three dyes and substrate at the same wave length. Since the rotation of the discs 87 to 89 is uniform throughout the whole spectrum, amounting in the illustrated case to one hundred revolutions for the full spectrum, the counters will register the integrated tristimulus values of the three dyes and substrate throughout the spectrum. The counters are shown with three significant figures, giving the integrated tristimulus values to one part in one thousand.

The cams 101 to 104 correspond to particular dyes and particular substrates. A different cam, therefore, must be used when any of these factors are changed. Accordingly, the cams are made removable with accurate positioning means. The tristimulus curves do not change and therefore cams 117 to 119 may be permanently affixed to the shaft. Cam 29 may also have to be changed if substrates are used which have very different diffusing properties.

The operation of the machine gives integrated tristimulus values for a given mixture of dyes and a substrate and can, of course, be extended to mixtures having more than three dyes by the addition of further cams and rheostats, but the result presupposes a predetermined type of illumination, for example, daylight. If the integrated tristimulus values are desired for a different kind of illumination, for example, tungsten incandescent light, this may be effected by using a different set of tristimulus cams 117 to 119 corresponding to the other illuminant, and for this reason these cams may also be provided with collars and set screws.

In some cases it may be desirable as a general practice to obtain integrated tristimulus values for two illuminants for every problem. In such a case this can be effected very simply by enlarging the machine, providing for six tristimulus cams, six rheostats driven by the cam 29, six matching potentiometers and six rotating discs and planimeter wheels. Of course the three additional tristimulus cams would also drive three additional potentiometers. This duplication is not shown in the drawings because it involves no difference in operation and the two sets of tristimulus values are obtained by parallel organization of elements which do not mutually affect each other's operation.

When color matching is desired, as has been described in the general portion of the specification, it is necessary to try successive mixtures. This is done, of course, by changing concentrations of the dyes by means of the potentiometers 1, 2 and 3. As soon as a change is made the machine is started up and gives the integrated tristimulus values for the new mixture.

The cams illustrated in Figs. 2, 3 and 4 are used to drive the rheostats directly. This makes by far the simplest mechanical design. It does require cams cut from fairly rigid material. If it is desired to use very thin gauge material, such as thin gauge metal, or plastic sheet material, the cams may drive the rheostats through a relay or very low friction rheostats may be used. The operation of the process and of the apparatus is not thereby changed. Any suitable relay may be used which will cause the rheostats to move with amplified force in exact proportion to the movement of a follower on the thin cams. The present invention is in no way concerned with the particular design of such a relay.

Fig. 8 illustrates a modification of the portion of the wiring diagram up to the cam 29. Corresponding parts bear the same reference numerals as they do in the preceding figures. This modification utilizes electrical capacities for combining concentrations of dyes with momentary values of K, instead of using electric voltages produced by the rheostats 9, 10, 11 and 4 in series with the concentration potentiometers 1 to 3 and the fixed resistor in series with rheostat 4.

In the capacity modification the shaft 110 carries four cams 101 to 104, but instead of driving the rheostats from these cams they are provided with grooves in which fit projections 157, 158, 159 and 160 on rods 295, 296, 297 and 298. These rods move racks 300, 301, 302 and 303, which in turn drive pinions 304, 305, 306 and 307 on threaded shafts 308, 309, 310 and 311 passing through threaded supports 312, 313, 314 and 315. On the other end of the threaded shafts are mounted condenser plates 161, 162, 163 and 164. These condenser plates are opposed by plates 171, 172, 173 and 174. The last plate is fixed but the other three plates are movable, being attached to racks 168, 169 and 170. The racks in turn are driven by pinions 165, 166 and 167 which are mounted on shafts capable of being turned manually and provided with dials 175, 176 and 177.

The cams vary the spacing of the plates in accordance with the values of K for the different dyes and substrate at each wave length. The area of the overlapping plates in the case of the three dyes is determined by the setting of the dials 175, 176 and 177, which dials express the change of area in terms of concentration. The capacity of each condenser is therefore the product of K by concentration of the dye in question.

The plates 161 to 164 are connected together, as are the plates 171 to 174. The sum of the capacity of the four condensers forms one arm of a Wheatstone bridge, the other two arms being formed by resistors 178 and 179. The remaining arm of the bridge is a variable condenser 180 which is turned by a balancing motor, as will be described below. Alternating current is applied to the two ends of the bridge and a coil 181 of the input transformer 23 of an amplifier 24 is across the bridge. This coil differs from the coil 20 in Fig. 1 in that it is not center tapped since the voltage applied to the bridge is A. C. and does not require conversion from D. C. The input of the amplifier 24 is, of course, proportional to the differential between the capacities of the condensers in the two arms of the bridge, and the output of the amplifier passing through wires 25 and 26 to the motor 28 causes the latter to turn the condenser 180 through a reduction gearing in a manner similar to that illustrated in Fig. 6, the condenser shaft being shaft 27 and there being no potentiometer. The shaft 27 drives direct the cam 29 which drives three potentiometers ganged together, as shown in Fig. 6. The movement of the condenser 180 is in a direction to equal the sum of the capacities of the four condensers corresponding to the three dyes and the substrate and the angular rotation of the shaft 27 is therefore a measure of the sum of the capacities of the four condensers.

In operation the spacings of the plates 171 to 173 are varied in accordance with the K of the dyes and substrate, the capacity of each condenser, of course, varying inversely with the spacing. Changes in concentration of the dyes are effected by varying the overlapping and hence effective area of the condensers. Since capacity varies linearly with overlapping, the scales 175 to 177 are linear and read concentrations directly.

The operation of the rest of the apparatus is identical with that described in connection with Fig. 1 because the cam 29 is turned in proportion to the sum of the products of the K's and concentrations of the dyes and K of the subtrate.

Theoretically the use of capacities instead of voltages, or the use of capacities in one section and voltages in another, give the same results with about the same order of accuracy. However, I prefer to use voltages because the condensers requiring variation of spacing are somewhat delicate. The stationary plate has to be kept exactly parallel with the moving plate and any departure from parallelism or any warping or distortion of either plate will destroy the accuracy of the machine. For this reason I prefer the potentiometer and rheostat method as the elements are more rugged. However, where the machine is used under conditions which impose no serious mechanical shocks it is entirely feasible to use capacities and the invention is intended broadly to include the use of any additive quantities and is not limited to the use of voltages, although this latter constitutes the preferred embodiment.

Figs. 9 and 10 illustrate a modification in which resistors are used in place of condensers, Fig. 9 showing the general wiring diagram. The condensers of Fig. 8 are replaced with variable resistors 271, 272, 273 and 274 for the three colors and the substrate, each resistor carrying a movable contact 275, 276, 277 and 278, respectively. The resistors are so constructed that their resistance varies as the anti-logarithm of tap position. The resistances, of course, are connected in series so as to be additive. These resistances are in proportion to C times K and form one arm of a Wheatstone bridge, the other variable arm being a resistor 279 with a movable contact 280 driven by a balancing amplifier and motor 283. The other two arms of the bridge are formed of fixed resistors 281 and 282 and a conventional source of voltage is shown across the bridge and represented by 284. The amplifier and motor are not shown in detail and operate on the same principle as the amplifier 24 and motor 28 in Fig. 8.

The production of the resistance is shown in Fig. 10 for one four decade exponential resistor 273. A cam 285 is turned in proportion to wave length and has a contour corresponding to log K for the particular dye. A cam follower 286 rides on the cam 285 and turns a shaft 287 carrying a pulley 288 which drives pulley 289 on a shaft 290. This in turn is carrying the movable contact 277. This contact moves over the four decades of the exponential resistor 273 which is mounted on posts 292 on the disk 293 which is journaled on the shaft 291. The edge of the disc is in the form of a scale which moves past a pointer 294. Rotation of the disc 293 moves all four decades of the resistor in proportion to the logarithm of the scale graduations, and hence can be used to vary the resistance in proportion to log of concentration. The motion of the contact 277 is in proportion to log K, and therefore the amount of resistance between contact and the end of the resistor is proportional to CK. The resistance is therefore an additive quantity proportional to CK, which corresponds to the voltages of Fig. 1 or the capacities of Fig. 8. It is possible to cause the motion of the motor driven contact 280 to be proportional to log K by choosing an anti-logarithmically wound resistance 179. The rate of change at extremes between log of K and R is much less than between K and R and this simplifies the design of the cam driven in proportion to the movement of the contact 280. The rest of the device may, of course, be the same as that shown in Fig. 1.

In spite of the transformation of the quantity matching the sum of K's for the three colors and substrate into a quantity proportional to log K or 1/K, difficulty may be encountered for extreme values of K which make maintenance of highest accuracy difficult. In the modification shown in Figs. 9 and 10 it is very simple to switch in different resistors for different ranges. The switching is conventional. It is thus possible to choose resistances which will give a higher degree of accuracy over a particular range than would be possible with a single set of resistors which would have to operate over the whole range. In a similar manner switching can be used in the modifications involving voltage and capacity matching, although this is more difficult in the case of capacity matching.

Fig. 9 is diagrammatic and shows resistances as straight. In order to obtain an adequate length of travel it is often desirable to use helical resistances or other designs permitting a long travel of a movable contact in a moderate space. The invention, of course, is not concerned with structural details of resistances as the design of these follows well known electrical practice.

Figs. 11 to 13 represent a preferred modification in which a more complicated circuit is used to give maximum accuracy over wide ranges of K and R. It has been pointed out in the general portion of the specification that, particularly with light shades, there is a considerable departure from inverse proportionality between K and b.

Fig. 13 shows in diagrammatic form the method of transforming spectrophotometric reflectance data into voltages corresponding to CK for three dyes, A, B and C and a substrate, and also shows the matching of the sum of these voltages by another voltage using a matching instrument similar to that shown in Fig. 1 but operating with a modified electrical circuit. Duplicate parts for the three dyes will carry the same reference numerals with the letter of the dye as a suffix.

Fig. 13 shows three attenuators, 200 for the substrate, and 210A, 210B and 210C for the three dyes. The attenuators are provided with batteries 201 for the substrate 211A-C for the dyes. The substrate attenuator has a motor driven cam 202 with a cam follower and arm 203. The corresponding attenuators for the dyes have cams 212 and followers and arms 213. The shapes of the cams, of course, are different and approximate b reflectance values of dyes at standard concentrations and of the substrate. The outputs of the attenuators for the dyes pass through manual attenuators 207A-C respectively, which attenuators can be adjusted in accordance with concentration of the dyes. The substrate, of course, has no manual attenuator as there is no variable concentration factor involved. The outputs from the substrate attenuator and the three concentration attenuators for the dyes are connected in series and represent a voltage which is proportional to the sum of K for the substrate and the CK's for the three dyes. Qualitatively the function performed by this device is the same as that performed by the rheostats and potentiometers of Fig. 1. However, as will be pointed out below, the circuits, used in the attenuators of Fig. 12 permit a much higher degree of accuracy over wide ranges of reflectance and concentration.

The sum of the voltages from the attenuators is connected in opposition to a voltage generated in an output attenuator 184 which is provided with a battery 231, cam 186, cam follower 187 and arm 188. The differential voltage is applied to an amplifier 183, the design of which is substantially identical with the amplifier 24 of Fig. 1. The amplifier is fed from an alternating current line 182.

The circuits of the various attenuators of Fig. 13 are shown in Fig. 12. Here again the parts for the different dyes are given the same reference numerals with the suffix letter corresponding to the dye.

The attenuator 200 is provided with three resistances, one, 205, being connected in series with the battery 201, and the other two, 206 and 207. The moving contacts on these resistances are ganged together and are moved by the arm 203 (Fig. 13). Their movement is therefore proportional to the profile of the cam 202 and hence to substrate b reflectance at different wave lengths throughout the spectrum. This type of attenuator transforms simple reflectance data into the additive function K and operates reliably even in the ranges of high reflectance. The negative terminal of the battery 201 is connected to the common wire 208 of the potentiometer which leads to a movable contact 222A of the concentration attenuator for dye A.

The attenuators for the various dyes have one section which is identical electrically with the attenuator for the substrate, the corresponding parts being numbered 211, 214, 215, 216A-c respectively. The negative terminals of the attenuators are 209A-c. In series with the attenuators for the dyes which transform $b$ into K are the manually set attenuators 217 and 218, which comprise the L attenuator proper 217 and 218 leading to contacts 219, of potentiometer 220 connecting a resistance 221 and a decade potentiometer 222. These constitute the load on the L attenuator. The purpose of the elements 219 and 220 is to allow adjustment for battery voltage changes without disturbing the balance of the rest of the circuit. Manual adjustment of the decade potentiometer permits multiplying the voltage corresponding to K of each dye by concentration, and therefore the outputs of the manually adjustable attenuators represent CK's.

The output attenuator 184 (Fig. 13), is of precisely the same design as the attenuators for the substrate but is connected, of course, in opposition to the sum of the CK voltages. Its parts are battery 231, series resistance 235, attenuator potentiometers 236, ganged movable arms 234, movable contact 239, resistance 240 connecting the two resistances 241 which forms the means of adjustment for battery voltage of the output attenuator. Tap 242 on this section leads through wire 223 to vibrating contact 224 which is vibrated by the coil 228 in cooperation with the magnet 227 and successively strikes contacts 225 and 226 which are connected to the center tapped input coil 185 of the amplifier 183. The common negative wire 229 of the output attenuator is connected to the negative wire 209Q.

The operation of the output attenuator is to match the voltage corresponding to the sum of the CK's by an equal and opposite voltage and to produce a mechanical displacement proportional to R. This is effected in the usual manner by the motor driven cam 186 which is driven from the amplifier 183. The shape of this cam is such that the output from the follower 187 and arm 188 is proportional to the reflectance corresponding to the sum of the CK's for substrate and three dyes. Because of the electrical circuit no problem is encountered in the cam contour.

It has been pointed out above that for maximum accuracy over a very wide range it is desirable to operate the machine over different ranges of K or R, which can be done very simply by switching in different resistors or capacities in the various modifications. The attainment of a predetermined degree of accuracy presents problems of varying degrees of difficulty in the various ranges. Where the values of R and $b$ are small, comparatively simple circuits will give maximum accuracy. The simplified circuit eliminates the ganged potentiometers by connecting the end of the resistance 205 for the substrate and 215A-c for the dyes directly to one end of the resistances 206 and 216, while the same end of these resistances is connected directly to the output impedance. Switching is effected by two conventional single pole double throw switches 237 and 238 which may be combined in a single unit if desired. When these switches 237 and 238 are thrown to cut out of circuit the movable contacts of the ganged potentiometers, the circuit for the substrate is in effect a rheostat in series with the battery and the output load for the substrate and a rheostat in series with the concentration potentiometer in the case of the dyes.

Fig. 11 shows the portion of the machine controlled by the operation of the matching attenuator 184. The motor 195 driven from the amplifier 183 operates pulley 197 on intermediate shaft through a cable 196 and further reduction is obtained from a small pulley on the same shaft to a large pulley 199 through the cable 198. This latter pulley drives the shaft on which the cam 186 is mounted. The follower 187 on arm 188 which moves the ganged contacts 234 also turns a pulley 194 over which runs a spring loaded cable 192 attached to a movable carriage 191. The movement of this carriage is thus in proportion to the $b$ reflectance corresponding to the sum of the CK's of the dyes and the K of the substrate. The carriage carries a planimeter wheel 246 radially movable over a disc 243 which is driven through a reduction from the motor 244, which motor likewise drives through a greater reduction a shaft 299 on which tristimulus cams 117, 118 and 119 are mounted. This same shaft also drives the cams for the substrate and the three dyes (see Fig. 13).

The rotation of the planimeter wheel 246 is proportional to the integral of the reflectance of the dyes and substrates with wave length. It is connected to a Selsyn motor 245, the field of which is fed from the common A.-C. line. All three phases of the armature of one Selsyn motor are directly connected to the corresponding phases of the armature of a second Selsyn motor while the field of the second Selsyn motor is connected to the input side of an amplifier 248. When the armatures are 90° out of phase no current flows. At any other position a current flows into the amplifier and is amplified and operates a motor 260 which drives a shaft 261 through suitable reduction gearing, to which shaft the armature of the Selsyn motor 247 is directly connected. As a result the shaft 261 is rotated in step with the planimeter wheel 246, the Selsyn 247 acting as a control for the amplifier. Three discs, 264, 267 and 270 mounted on shafts 263, 266 and 269 are driven from the shaft 261 by pairs of bevel gears 262, 265 and 268. Carriages provided with planimeter wheels 254, 255 and 256 are moved radially on the discs 264, 267 and 270 by the rods 250, 251 and 252, which are actuated by the cam followers riding on the cams 117, 118 and 119 which are designed to move the carriages proportional to the tristimulus function values at each wave length and for the predetermined illuminant. The carriages are provided with counters 257, 258 and 259.

Since the rotation of the discs 264, 267 and 270 is proportional to the integral of reflectance with wave length and the rate of rotation of the planimeter wheels 254, 255 and 256 is proportional respectively to the tristimulus function values at the different wave lengths, the counters will give the integrated tristimulus values or multiples thereof in the same manner as the counters in Figs. 2, 3 and 5. The counters may advantageously be of the same type and read to one part in a thousand.

The modification shown in Fig. 11 substitutes an all mechanical integration for the part mechanical and part electrical integration of Figs. 1 to 5. This method is preferable from the standpoint of simplicity and ruggedness. It is not dependent for its operation on use with the preferred electrical circuits of Figs. 12 and 13 as, of course, the carriage 191 may be moved by the cam 29 of the modification of Fig. 1. The invention is, therefore, very flexible with respect to the summing and integrating portions of the process or device and the best combination may be chosen for each purpose. This great flexibility in design is an important practical advantage.

Fig. 11 shows three tristimulus integrators, just as do Figs. 2 and 3. This is sufficient where data is required for a single illuminant only. When integrated tristimulus values are desired for a plurality of illuminants more than one set of three discs may be driven from the shaft 261 requiring, of course, additional sets of tristimulus cams on the shaft 299 and of course additional planimeter carriages and counters.

The circuits shown in Fig. 12 generate voltages as physically additive quantities. This has the advantage that a single network is usable for each color and substrate. However, there is a disadvantage in that the attenuators to operate reliably must be fed from voltage sources of known values, and the circuits must be adjusted when these values vary as f. e. when batteries run down. In practice it is often difficult to maintain this adjustment and a modification which is not dependent on matched voltages is a practical consideration. Fig. 15 shows the circuit for such a modification in which currents instead of voltages becomes the physically additive quantities. The wiring diagram shows only the input and output attenuators, which in this modification are symmetrical pairs, and does not show the details of the cam drive from the shaft moving the output attenuator contacts. This will be the same as in Fig. 12 and mechanical integration is effected in the same manner as with the corresponding output cam in Fig. 11.

In the preferred modification of Fig. 15, pairs of input and output attenuators are arranged symmetrically in the form of a bridge circuit which is fed from a single voltage source and which can be brought to balance regardless of changes in the voltage source. The input attenuators are shown for three dyes and a substrate as in Fig. 12 and will be given the letter suffixes A, B and C, referring to the three dyes and S for the substrate. The symmetrically arranged attenuators being identical in structure will have their component parts carry the same reference numerals.

A voltage generator 316 feeds a motor driven potentiometer 317. The positive lead 318 runs through a resistor 319 to an input bus 320 of one set of input attenuators. The negative lead 321 leads to the corresponding bus 320 of the other set of symmetrical input attenuators. The negative and positive leads also connect respectively to the two symmetrical output attenuators. These latter consist of input rheostats 322, resistances 323, series resistances 324, and tapped output resistances 325. One end of the resistances 323 and 325 in each attenuator is connected to a bus 326. The output currents from the attenuators flow through leads 327. The movable contacts on the rheostats 322 and resistances 323 are ganged and are motor driven from a balancing amplifier which will be described below.

The output attenuators may be adjusted for the different ranges in a manner similar to the input attenuators of Fig. 12 by means of conventional double pole double throw switches. When the switches are thrown to the left, the movable contact on each of the rheostats 322 are connected to the corresponding movable contact on one of the resistances 323 in each attenuator and one end of the other resistance 323 is connected to one end of the series resistance 324. When the switch is thrown to the right, the movable contact of the rheostat 322 is connected directly to the end of the series resistance 324, thus throwing resistances 323 out of the circuit. The resistance effects are the same as described in conjunction with the voltage device in Fig. 12.

The input attenuators are substantially similar in design to the output attenuators. Like the latter, they consist of input rheostats 328, two resistances 329 having one end connected to the bus 326, a series resistance 330 and an output resistance 331 with output lead 332. In the case of input attenuators, A, B and C, the series resistance 330, however, instead of leading to a fixed tap on the output resistance 331 as in the case of resistances 324 and 325 of the output attenuators and resistances 330S and 331S of the substrate attenuators, leads to a movable contact which is adjustable in accordance with concentration changes exactly as are the movable contacts on the potentiometers 222 A to C in the circuits in Fig. 12. The same function is performed, but movement of the contacts on the resistances 331 also requires adjustment of the value of the resistances 330.

The double pole double throw switch in each input attenuator operates in the same manner as the switches in the output attenuators, that is to say, when thrown to the left the movable contact on rheostats 328 is connected to the movable contact on one of the resistances 329 and the free end of this resistance is connected to the movable contact on the other resistance 329. The three movable contacts for each pair of input attenuators are ganged together and driven from a suitable cam as described in conjunction with the voltage networks in Figs. 12 and 13. When the switch is thrown to the right, the movable contacts on the rheostats 328 are directly connected to the movable contact from the second of the two resistances 329 and the first resistance is thrown out of circuit.

The rheostats 328 of the input attenuators are fed from the two busses 320 and similarly the output leads 332 of the input attenuators are connected to busses 333. It will be noted that the drawing shows four pairs of input attenuators, three receiving data from three colors and the fourth one from the substrate. This latter does not have a manual adjustment on the output resistance 331 as there are no adjustments for changes in concentration of the substrate. This output resistance is therefore shown as permanently tapped to the end of the resistance 330 and therefore exhibits a circuit network which is the same as the output attenuators. The ganged movable contacts of the rheostats 328A and resistances 329A of the attenuators are shown as mechanically connected by conventional dashed lines on the drawing. The corresponding dashed lines from the connected contacts of the other pairs of attenuators corresponding to dyes B and C and the substrate are indicated by short dashed lines which are not carried across the drawing because of the confusion which would otherwise result.

The busses 333 are connected to the output leads 327 of the output attenuators. The busses 326 are shown on the drawing as connected together through a lead to emphasize symmetry. In practice, they may, if desired, constitute a single bus.

A detector amplifier 334 capable of converting D. C. currents or potential to amplified A. C. currents of phase determined by the direction of the D. C. current is connected across the two leads 327 of the output attenuators. It is fed by an A. C. power supply 335 and its output drives a motor 336. This motor in turn moves the ganged contacts on rheostats 322 and resistances 323 of the two output attenuators and also the movable contact on the potentiometer 317. The motion is in a direction to produce balance in the amplifier as will be described below.

In operation, equal and opposite currents flow through symmetrical branches of the network, and a symmetry of potentials exists about the mid-potential of buses 320, which is always equal to the potential of buses 326.

Leads 327 being symmetrical, are always at equal and opposite potentials, with respect to bus 326. When leads 327 are at equal potentials this potential is therefore that of bus 326. No current flows through the detector 334, and consequently the sum of the current outputs of the input attenuators flowing in or out of buses 333 equals the current outputs of the output attenuators flowing in or out of buses 327. If, however, there is any unbalance in the magnitude of the sum of the currents from the input attenuators and the currents of the output attenuators, this current flows through the detector and a signal is impressed on the amplifier 334 which signal is amplified and causes the motor 336 to turn. As has been mentioned above, the direction of rotation of the motor is such that it will vary the currents leaving the output attenuators in a direction to bring them to equality with the sum of the currents from the input attenuators, and simultaneously equalize the potential of leads 327. When such balance is reached, the signal disappears and the motor stops.

The motor shaft drives a suitable cam in the same manner that the cam 186 is driven by the output balancing motor in Fig. 13 and this cam then transmits motion to the integrators as shown in Fig. 11. In other words, Fig. 15 is simply a different and improved arrangement of circuits which take the place of the voltage adding circuits of Fig. 12.

It will be noted that the movement of the motor 336 also moves the contact on the potentiometer 317 and therefore varies the voltage impressed on the input and output attenuators. While it is not absolutely essential to the operation of the device that the voltage be varied as the output attenuators change their current, it is very desirable in practice that the voltage may be changed in accordance with the orders of magnitude of the currents to be matched. This permits maintaining substantially constant sensitivity and at the same time reduces battery drain for low attenuator resistances.

It has been stated above that the nature of the surface reflectance component $s$ will vary with different fabrics. With many fabrics such as, for example, woolen fabrics, the absolute magnitude of the surface reflectance is small and is substantially unaffected by the type of dyestuff used. Any variations between dyestuffs are negligible. The device described in Figs. 11 to 15 will give indications of integrated tristimulus values with high accuracy with such fabrics and reasonable accuracy may be achieved with some of the less complex modifications shown in Figs. 1 to 10. Some other fabrics show a considerable variation of $s$ with different types of dyestuffs and its absolute magnitude is often much larger with such fabrics than with woolen fabrics. Some of these fabrics may be handled by the same design of machine shown in Figs. 11 to 15 for wool throughout certain ranges. Thus, for example, the absolute magnitude of $s$ is generally larger with very low values of reflectance R and drops off in absolute magnitude with more lightly dyed materials. Even with fabrics which show a large $s$ and a considerable variation with dyestuff types may therefore be handled provided the sample is not too heavily dyed. Other fabrics with very large surface reflectance components and greater variation of $s$ with dyestuff types may be handled by apparatus of the same general type by suitable change in profile of input and output attenuator cams. As these cams can be designed to be rapidly interchanged, the predictor of the present invention can be used for various types of fabrics without major constructional changes.

It is an advantage of the present invention that the method and device is extremely flexible and that the desired degree of accuracy in color prediction can be obtained throughout the whole usable range of color strengths by choice of the appropriate circuits.

The core complicated circuit networks described in the preferred modification constitute voltage generating or matching means just as much as do the simple potentiometers of some of the other modifications. The term "voltage generating means" will be used to include both simple circuits and more complex networks, and this more general scope of the term will be used in the claims. Many designs of simple and complex voltage generating circuits are known to the art. Several typical ones are shown in the detailed description of the drawings. The invention is, however, not broadly limited to any particular electrical design of voltage generator.

As is well known there are a large number of theoretical tristimulus curves which may be used in interpreting color data, even for a single illuminant. In order to simplify computation, it has been customary to employ sets of tristimulus functions which exhibit no negative values. These tristimulus functions are also characterized by the fact that one of them corresponds with or closely approximates the visual response curve of the normal eye. For many purposes the customary tristimulus values present definite advantages, and of course they may be used in color predictors of the present invention. However, there is considerable overlapping of the curves of these various tristimulus functions so that change in the concentration of a single dye will often affect two, or, in some cases, 3 of the tristimulus functions at the same time. This interaction sometimes makes matching more difficult as more approximations obtained by changing concentration data may be necessary. In some cases it may be desirable to operate with tristimulus functions which provide for less overlap, even at the expense of requiring negative values at certain wave lengths. It is possible with some of these specially chosen tristimulus functions to make successive approximations in color matching easier. Of course, negative number present no particular problem with the preferred type of integrator using discs and planimeter wheels, as they are simply expressed by a motion of the planimeter wheel past the center of the disc so that in the zone of negative tristimulus number the wheel runs backwards. This simply means that the lowest point of the profile of one or more tristimulus cams may represent a position of the planimeter wheel on the opposite side of the center of the disc.

It is an advantage of the present invention that it may be used with equal efficiency with a large number of different tristimulus curves and is not restricted to any unique sets.

The drawings have illustrated predictors which operate to predict the integrated tristimulus values of three dyestuffs and a substrate. This is a typical illustration of the process and suitable apparatus as the problem of predicting the integrated tristimulus values of three dyestuffs and a substrate is a common one. However, neither the process nor the apparatus are limited to three dyestuffs, and a substrate. On the contrary, the method can be used with any number of dyestuffs, with or without a substrate. In practice, it is often desirable to construct predictors with facilities for handling considerably more than three dyestuffs. When such devices are employed in the common problem of predicting the shade of three dyestuffs, only the stages for additional dyestuffs are electrically by-passed.

In the specific embodiments described in the drawings, integration has been effected with respect to wave length, and for many operations this is the simplest way to set up the tristimulus functions. However, it is not necessary that the integration be with respect to wave length. On the contrary, with a suitable modification of the values of the tristimulus functions, integration may be effected with respect to any function of wave length. This requires turning the integrator discs in accordance with that function, and choice of cam profiles suitable to the modified tristimulus functions. One modification which presents advantage involves integration with respect to the logarithm of wave length or frequency, instead of wave length itself. Since wave length itself may be considered as a function of wave length, the latter term will be used in the claims, broadly, to include integration with respect to wave length or to any other function thereof.

In the first step of the process of the present invention, physical quantities are produced proportional to the product of the additive function of each dye separately and of the substrate. For most practical operations, this is the simplest and by far the most satisfactory method of obtaining the sum of physical quantities proportional to additive functions which will represent the additive function of the dyes and substrate together. It is, however, possible to obtain the same result by producing quantities proportional to additive functions of each dye as dyed on a predetermined substrate. Mathematically, the difference may be seen by a consideration of the following generalized relations. Where the additive function of each dye is taken separately and multiplied by concentration, the additive function of the mixture as applied to a substrate S is given by the following expression:

$$Km = C_A K_A + C_B K_B + C_C K_C + \ldots K_s$$

However, the same result may be obtained by taking the additive function of each dye dyed on the substrate S, the expression being as follows:

$$Km = C_A K_{AS} + C_B K_{BS} + C_C K_{CS} + \ldots + (1-C) K_s$$

$$C = C_A + C_B + C_C + \ldots$$

In the figures of the drawing there has been no specific discussion of the data used in determining the ratio variation of the drives used in the various methods of generating quantities corresponding to CK for each dyestuff. They may be based on wave length as the independent variable. It is, however, an advantage in some cases to use data for dyestuffs obtained on the more modern type of recording spectrophotometer which provides constant resolution throughout the spectrum by utilizing log λ instead of λ as the abscissa for spectrophotometric plots. When data from such an improved machine is used, the tristimulus functions will include the inverse derivative of log λ. That is to say, they will be the ordinary tristimulus functions multiplied by λ. As pointed out in the introductory portion of the specification the term "tristimulus function" is used in a broad sense and includes such a case.

The device and method of the present invention are particularly useful in indicating the integrated tristimulus values of fabrics dyed with dyestuffs. However, their utility is not restricted to such samples. It is also possible to measure fabrics which have been colored with pigments that form light tints. The term "colorants" is therefore used in the claims to cover both dyestuffs proper and pigments suitable for fabric coloring. Surface coating utilizing pigments sometimes do not present a surface in which the relation of additive functions of the different colors are the same as with dyestuffs. In the cases of such coatings, a somewhat different type of method and machine becomes necessary.

This is in part a continuation of my co-pending application, Serial No. 667,975, filed May 7, 1946, now abandoned.

I claim:

1. A color predictor for continuously predicting the reflectance of substrates dyed with a plurality of dyes, which comprises in combination means to generate continuously a plurality of equal first variable quantities proportional to wave-length, means of transforming each of said first quantities into second variable quantities proportional to a non-linear function of said first quantities said function being directly proportional to the additive absorption function K for each dyestuff, pre-selectable means responsive to said second quantities to modify them to produce a third set of additive quantities proportional to the product of concentration of each dyestuff and K, means for summing said third quantities, non-linear means responsive to said sum to produce at least one fourth quantity each directly proportional to reflectance of the dyestuffs and substrates at the wave-length corresponding to the first quantities.

2. A color predictor according to claim 1 in which the additive quantities are electrical quantities.

3. A color predictor according to claim 2 in which the electrical quantities are voltages.

4. A color predictor according to claim 3 in which non-linear means are provided for transforming the first quantities into mechanical drives proportional to body reflectance b and a voltage generating means consisting of circuit networks comprising a plurality of mechanically driven variable resistances driven by said mechanical drive proportional to b the network characteristics producing an electrical output constituting the third set of quantities proportional to concentration times K for each dyestuff and substrate.

5. A color predictor according to claim 1 in which the additive quantities are electrical currents.

6. A color predictor according to claim 1 in which automatic means are provided for continuously modifying each of said fourth quantities by one of a series of fifth variable quantities by means simultaneously and continuously generated in proportion to said first quantities, each fifth quantity being proportional to a tristimulus coefficient for the wave-length corresponding to the first quantity, the modification producing a set of the sixth quantities proportional to reflectance times each tristimulus coefficient and means for integrating said sixth quantities with respect to said first quantities to produce seventh quantities proportional to the integrated tristimulus values of the substrate dyed with the dyes.

7. A color predictor according to claim 6 in which the additive quantities are electrical quantities.

8. A color predictor according to claim 7 in which the electrical quantities are voltages.

9. A color predictor according to claim 1 in which automatic means are provided for continuously modifying each of said fourth quantities by one of a series of fifth variable quantities by means simultaneously and continuously generated in proportion to said first quantities, each fifth quantity being proportional to a tristimulus coefficient for the wave-length corresponding to the first quantity, the modification producing a set of the sixth quantities proportional to reflectance times each tristimulus coefficient and means for integrating said sixth quantities with respect to said first quantities to produce seventh quantities proportional to the integrated tristimulus values of the substrate dyed with the dyes and the additive quantities are electrical currents.

10. A color predictor according to claim 9 in which means are provided for transforming the first set of quantities into a mechanical drive proportional to body reflectance $b$ for each dyestuff and means are provided in the form of symmetrical attenuators and a source of current, the attenuators including mechanically driven resistances driven by said mechanical drive proportional to $b$, the circuit networks of each attenuator pair producing currents proportional to $K$ for each dyestuff, manually adjustable components of the attenuator network multiplying the current produced by the concentration for each dyestuff, means for adding the multiplied currents for each set of attenuators, a pair of output attenuators operating from the same current source consisting of electrical networks comprising mechanically driven resistances, means for mechanically varying the values of said resistances in response to difference between the input of the attenuator currents, said mechanical means including a non-linear drive which combined with the circuit network produces a physical displacement of the drive means proportional to the fourth set of quantities.

11. A color predictor according to claim 10 in which means driven by the mechanical means for varying the values of the resistances of the output attenuators simultaneously varies the potential of the source of current in a direction to produce variation in sensitivity of the predictor.

ROBERT HIRAM PARK.

REFERENCES CITED

The following references are of record in the file of this patent:

UNITED STATES PATENTS

| Number | Name | Date |
| --- | --- | --- |
| 1,559,325 | Jewett | Oct. 27, 1925 |
| 1,986,986 | Swartwout | Jan. 8, 1935 |
| 2,434,274 | Lakatos | Jan. 13, 1948 |
| 2,443,624 | Lovell et al. | June 22, 1948 |
| 2,476,747 | Lovell | July 19, 1949 |

OTHER REFERENCES

Electronic Computers, Shannon, Electronics, pp. 110–113, August 1946.

"A Mechanical Integrator for Evaluating the Integral of the Product of Two Functions and its Application to the Computation of I. C. I. Color Specifications from Spectrophotometric Curves," by J. A. Van Akker; Journal of the Optical Society of America; vol. 29, Sept. 1939, pp. 364–369.